No. 12,438. REISSUED JAN. 23, 1906.
E. FISHER.
PIPE WRENCH.
APPLICATION FILED JUNE 28, 1905.
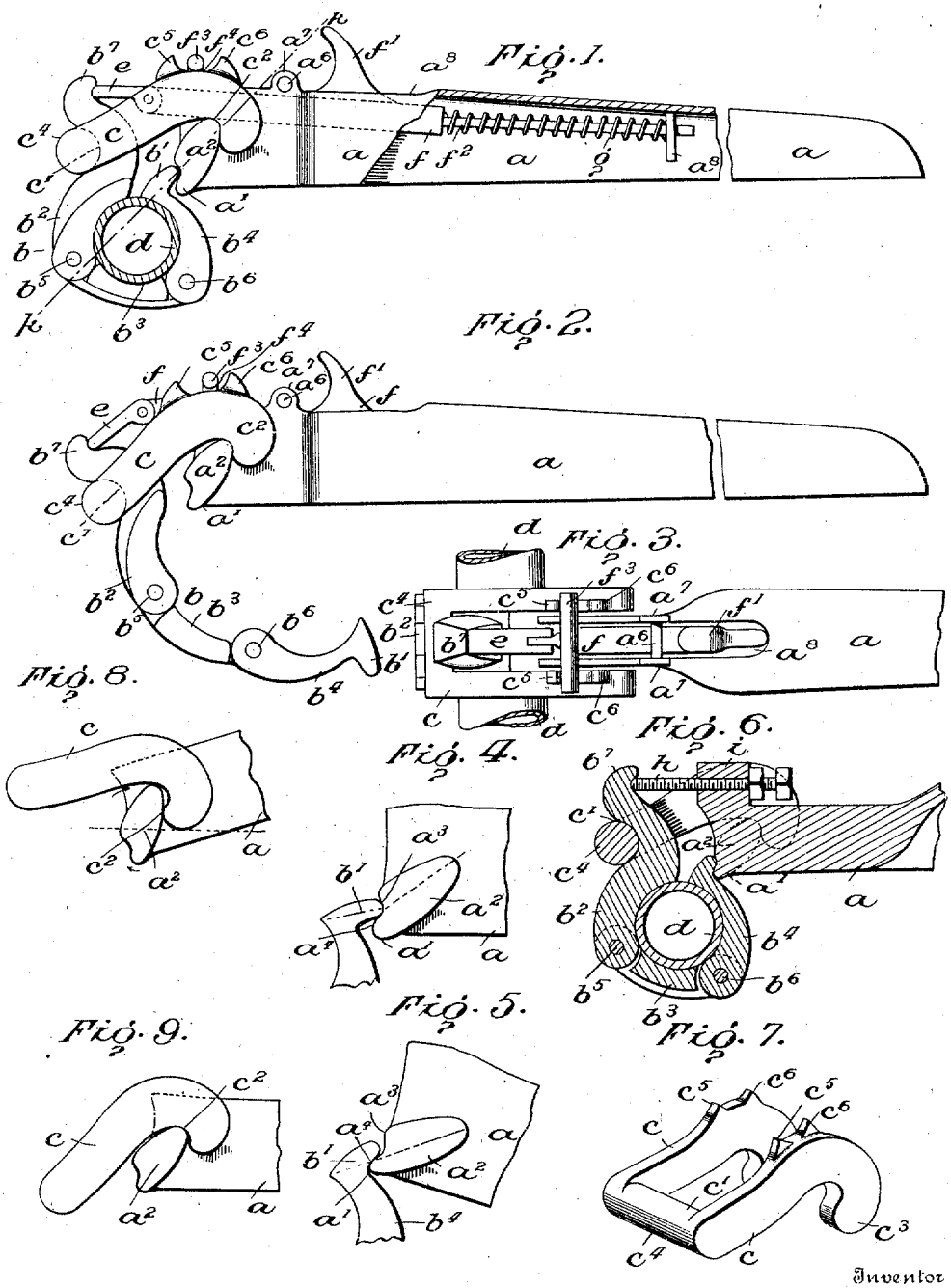
Witnesses:
Wm. B. Kerkam
Gustave P. Thompson
Inventor
Ebenezer Fisher,
By Mauro, Cameron, Lewis & Masson,
Attorneys

UNITED STATES PATENT OFFICE.

EBENEZER FISHER, OF PHILADELPHIA, PENNSYLVANIA, ASSIGNOR, BY DIRECT AND MESNE ASSIGNMENTS, TO FISHER WRENCH COMPANY, OF EGG HARBOR, NEW JERSEY, A CORPORATION OF NEW JERSEY.

PIPE-WRENCH.

No. 12,438. Specification of Reissued Letters Patent. Reissued Jan. 23, 1906.

Original No. 773,933, dated November 1, 1904. Application for reissue filed June 28, 1905. Serial No. 267,460.

*To all whom it may concern:*

Be it known that I, EBENEZER FISHER, a subject of the King of Great Britain, and a resident of Philadelphia, county of Philadelphia, and State of Pennsylvania, have invented certain new and useful Improvements in Pipe-Wrenches, of which the following is a full, clear, and exact description.

My invention relates to improvements in pipe-wrenches of the class employing as the gripping member of the wrench a series of linked sections or segments adapted to conform to the surface of the pipe and operating by friction. Heretofore the chief difficulty experienced in the use of wrenches of this character has been found to arise from the very limited and restricted movement of the gripping-loop in the act of engaging about the pipe and in expanding and contracting about the pipe during the operation of the wrench thereon, by reason of which not only is facility of operation wanting, but in the event of pipes varying slightly in size, which is very common, or having irregular surfaces an utter failure of gripping ensues.

It is therefore my object to so construct a wrench of this character that it shall not only firmly and securely grip the pipe without slipping when moved in the gripping direction, but also have sufficient self-adjusting expansibility and contractibility in its linked loop or gripping member to permit it to accommodate itself within certain limits to pipes varying in size and be effective notwithstanding any lack of uniformity in the pipe-surfaces and as a result of this greater range of movement the more readily permit the application of the wrench to the pipe and its removal therefrom.

Another object of the invention is to provide for a change of leverage, so that after a clamping pressure of the requisite force has been applied to the loop the direction of the leverage will be such as to exert a pulling action on the loop, thus admitting of the application of any degree of force without injury to the pipe.

The improved wrench embodying my invention comprises a gripping loop or member adapted to substantially encircle a pipe or other cylindrical body, a main supporting member adapted to fulcrum on one end of the loop, and a link or oscillating member fulcrumed on the main supporting member and engaging and supporting the other end of the loop, these elements being so arranged that the action of the main supporting member in applying leverage will cause the swinging end of the link connection and the fulcrum of the loop on the main supporting member to approach each other, thereby simultaneously forcing the two ends of the gripping-loop toward each other and causing the loop to grip the pipe.

An important and distinctive characteristic of the invention consists in so proportioning and disposing the elements above mentioned that when in gripping position about a pipe a straight line drawn through the fulcrum-points of the link on the main supporting member and the latter on the loop will pass through the center or axis of the pipe or between the same and the swinging end of the link. This relation of the parts insures immediate positive gripping of the pipe without slipping.

The invention further consists in so constructing the loop and main supporting member of a gripping device of the general character of that above set forth that the direction and point of application of power to one end of the loop will change during the application of the leverage for the purpose of bringing about and maintaining a clamping pressure upon the gripping-loop, which will not be unduly increased by the continued application of power in turning the pipe or other device to which the gripping-loop is applied. This is accomplished in the present instance by forming the swinging link with a hooked or bent end and so arranging the parts that one of its ends bears on one end of the loop, while the other end of the bent link is fulcrumed on the main support in such manner that the point where the link bears on the fulcrum shifts toward the bend of the link as the main support is moved in the direction to turn the pipe.

The invention further consists in certain other novel features in the construction and arrangement of parts, as hereinafter fully set forth and claimed.

In the accompanying drawings, Figure 1 is a view in broken side elevation, showing the wrench applied to a pipe, the parts being in the position for the application of the leverage. Fig. 2 is a view in side elevation, showing the position of the parts when the gripping-loop is disengaged from its bearing on the main supporting member. Fig. 3 is a top plan view of the device. Fig. 4 is an enlarged detail view showing the initial position of the coöperating fulcrum-faces of the loop and supporting member. Fig. 5 is also an enlarged detail view showing the coöperating fulcrum-faces after the shifting of their points of contact upon the application of the initial clamping leverage. Fig. 6 is a longitudinal vertical sectional view of a modified form of the device, in which adjustment is made with a set-screw. Fig. 7 is a perspective view of the oscillating or link member for connecting the outer end of the gripping-loop with the lever or handle. Figs. 8 and 9 are views showing different relative positions of the link and the lugs on which said link fulcrums on the main supporting member.

Referring to the drawings, $a$ indicates the main supporting member constituting the lever or handle of the device, which is of the usual hollow construction and is formed with an engaging toe $a'$, constituting the fulcrum-point of the lever engaging one end of the gripping-loop $b$, which terminates in the hook or projection $b'$. The other end of the gripping-loop is connected with the lever $a$ by means of an oscillating or link member $c$, projecting forward at the end of the lever $a$ and engaging the end of the loop at $c'$, so that the said loop will be supported in advance of the end of the main lever and substantially encircling the pipe. The inner end of the member $c$ fulcrums on the lever $a$ at $c^2$.

The gripping-loop is formed of three members or segments $b^2$, $b^3$, and $b^4$, pivotally joined at $b^5$ and $b^6$ and presenting smooth inner curved faces to the pipe $d$, which permit the loop to conform within certain limits to pipes varying in size.

In the operation of the device in effecting an instantaneous and firm gripping of the pipe on the slightest movement of the lever $a$ in the gripping direction the relative positions of the fulcrum-point $a'$ and the bearing-point $c'$ of the link $c$ is of importance. The turning movement of the lever $a$ causes this fulcrum-point $a'$ and bearing-point $c'$ to approach each other, carrying with them, respectively, the end links $b^4$ and $b^2$ of the gripping-loop, thereby causing the loop to tightly grip the pipe. During this turning movement the link $c$ rocks on its fulcrum $c^2$ and the fulcrum-point $a'$ approaches the line between fulcrum $c^2$ and bearing-point $c'$, so that the greater the power applied to the lever $a$ the greater will be the tendency to cause the points $c^2$, $a'$, and $c'$ to approach an alinement.

Having thus more particularly explained the general principles of operation involved, the details of construction and operation will now be described.

The link $c$ is preferably in the form of a bifurcated hook comprising two arms connected at one end by a bar $c^4$. At their other ends the arms are bent to form hooks which engage lugs $a^2$ $a^2$, projecting from opposite sides of lever $a$, whose forward end is thus embraced by the arms, while the lugs $a^2$ afford fulcrums or bearing-points at $c^2$ for the hooked ends of link $c$. It will thus be seen that the hooked link $c$ in effect constitutes a bifurcated bent link turning about the fulcrum-points $c^2$ on the lugs $a^2$ on the end of the lever $a$, Figs. 8 and 9, which fulcrums change or move during the gripping operation or application of power to lever $a$. At the commencement of the tightening of the loop the fulcrum or bearing point $c^2$ is at or near the outer end of the short arm of the link. As lever $a$ is moved farther in the gripping and turning direction, rotating the lugs $a^2$ in the direction of the arrows, Fig. 8, the point $c^2$ is gradually advanced along the short arm toward its junction with the long arm well within the curve or bend of the hook which forms said short arm, as shown in Fig. 9. This shortening of the effective length of the short arm or hook throws the strain of the pull more nearly along the line of the long arm at the time it usually becomes necessary to apply the greatest power to the wrench to effect the turning of the pipe. A careful study of the drawings will disclose the fact that this shifting of the fulcrum-point $c^2$ as the application of power increases results in the power applied to the member $b^2$ through link $c$ being applied with a decreasing advantage and is gradually shifted in a direction tending to cause the link to give a pull on the member $b^2$ along the long arm of the bent link, Fig. 8. As a matter of fact the fulcrum $c^2$ shifts but slightly and never moves far enough to give a direct pull along the long arm; but the tendency in this direction is sufficient to avoid any danger of crushing the pipe when power is applied to the lever $a$ and yet at all times maintains perfect frictional engagement between the loop and pipe to prevent slipping. The more nearly the bearing at $a'$ approaches the line between the points $c'$ and $c^2$ the more will power applied to lever $a$ tend to turn the pipe rather than apply a crushing gripping action thereto.

As will be seen by reference to Figs. 4 and 5, the toe $a'$ of the lever $a$ is provided with a fulcrum-surface, the concave portion $a^3$ of which receives the point of the projection $b'$ and causes the initial leverage to act upon such projection, as indicated by the dotted lines in Fig. 4, to clamp the terminal segment $b^4$ against the pipe, thus increasing the initial friction between the pipe and loop, and the convex surface $a^4$ subsequently engages the under surface of said projection $b'$, thus changing the direction of the force of the leverage to exert a pulling action on the loop, which will admit of the application of a degree of force for turning the pipe that if applied through the initial clamping action might injure it.

The end of member $b^2$ of the loop is bent or hooked to engage the bar $c^4$ of link $c$, thus admitting of loops of various sizes being readily substituted.

The loop being placed about the pipe and the projection $b'$ engaged with toe $a'$, the parts immediately adjust themselves to closely embrace the pipe, the slightest movement of handle $a$ causing them to positively grip the pipe notwithstanding slight variations in the size of the pipe for which the particular loop is intended. Furthermore, one size of loop may be used on pipes of different commercial sizes within much wider limits than has heretofore been possible with other similar wrenches. The pipe will be gripped and turned without slipping of the parts on the pipe and consequent damage to the surface of the latter and lost motion. This avoidance of slipping and lost motion is particularly important where only limited space is available in which the wrench may be manipulated; but it has been discovered that the obtainment of complete efficiency of operation in this respect requires that the parts be so proportioned and disposed that when in gripping position, as shown in Fig. 1, for example, an imaginary straight line $k\ k$, drawn through the point at which toe $a'$ engages projection $b'$ and the fulcrum-point $c^2$, will pass through the center of the pipe or between its center or axis and the outer end of link $c$. This relation will be maintained notwithstanding changes in the position of fulcrum-point $c^2$ and the point of contact between projection $b'$ and toe $a'$, heretofore described as taking place as the result of applying power to lever $a$. Under these conditions the pressure exerted by toe $a'$, particularly the initial pressure which tightens the loop to effect immediate positive gripping, tends only to contract the loop by forcing the segment $b^4$ upward around the top of the pipe, Fig. 1. If the parts were so proportioned and disposed that the line $k\ k$ passed through the pipe on the opposite side of its center or axis, the pressure exerted by the toe $a'$ would necessarily tend to move segment $b^4$ downward around the right-hand side of the pipe, as seen in Fig. 1, thus tending to spread instead of contracting the loop. Under such conditions prompt positive gripping of the pipe would not be secured and the loop would tend to slip on the pipe and fail to make a tight grip.

It is desirable that provision be made for holding the loop $b$ firmly coupled to the oscillating member $c$, so that they cannot be shaken apart when not on a pipe, as shown in Fig. 2, and in a manner that will readily permit the removal of the loop from the handle $a$ at the will of the operator. To this end and for a purpose hereinafter referred to the member $b^2$ is extended beyond its hook or curve by which it engages the bar $c^4$ and to terminate in a reverse hook $b^7$, which is engaged by a dog $e$, pivoted on the end of a spring-actuated bolt $f$. This bolt lies partly within the hollow of the handle and at its forward end projects therefrom into a groove or channel $a^3$, formed in the top of the lever $a$ at its forward end. The bolt is retained within its channel by the pin $a^6$, held within the perforated ears $a^7$, and its forward movement is limited by the finger-hold $f'$ coming in contact with said pin. The bolt is normally pressed forward by the coil-spring $g$ bearing at one end on the shoulder $f^2$ and at its other end on the lug $a^8$, which lug forms a support for the rear end of the bolt. By means of the finger-hold $f'$ the bolt is readily drawn back against the pressure of its spring when it is desired to disengage the dog $e$ from hook $b^7$, and thus release the gripping-loop.

The action of the spring $g$ upon the end of member $b^2$ through the bolt $f$ and its pivoted dog $e$ is such as not only to project the dog into engagement with the hook $b^7$, but also to normally press against the swinging end of link $c$, and thereby force the member $b^2$ of the gripping-loop toward the toe $a'$ of the lever, thus assisting the contraction of the loop about the pipe and further assuring prompt positive gripping action without slipping or lost motion. The pressure exerted by spring $g$ upon link $c$ through bolt $f$, dog $e$, and member $b^2$ also holds the hooks at the end of link $c$ in engagement with lugs $a^2$.

When it is desired to remove the wrench from a pipe, the loop must be swung outward, overcoming the action of the spring $g$ until the projection $b'$ is free from the toe $a'$ of the main lever, and a similar outward swinging of the loop and an upward swinging of the link member $c$ is required to adjust the loop in operating position on a pipe.

To further assist in holding the oscillating link $c$ in engagement with the lug $a^2$ and permit of freedom of oscillation thereof, the bolt $f$ is formed with a bar $f^3$, preferably on a slightly-raised portion $f^4$ and integral therewith. Said bar extends across the bolt and projects over and bears on the link $c$ at each side between stops or lugs $c^5$ $c^6$ cast thereon and sufficiently far apart to permit a certain amount of movement of the link. By the engagement of bar $f^3$ with the stops or lugs $c^5$ the spring $g$ normally exerts a pressure to cause the link to lower at its swinging end as well as holding it in its hooked position on the lugs.

Although it is preferable to employ the spring-actuated bolt or its equivalent acting in the manner above set forth to secure initial gripping as soon as the loop is placed about the pipe, such device may be omitted, the natural tendency of the loop to contract and automatically adjust itself to the pipe being sufficient to effect such initial gripping, or this initial gripping may be further effected by a set-screw $h$, working in the lug $i$, formed on the end of the lever, as shown in Fig. 6. In this form of the wrench the hook $b^7$ engages the end of the screw, which forms therefor an adjustable stop, while its pressure forward on the end of member $b^2$ acts to bring the gripping-loop against the toe $a'$ as well as bring the said member $b^2$ down on the pipe $d$ in the manner and with the effect heretofore pointed out.

It will be obvious that the combination and arrangement of levers and gripping-loop herein described may be used as a clutch in connection with a pulley or other device and such is within the scope and spirit of the invention.

Having thus fully described my invention, what I claim, and desire to secure by Letters Patent, is—

1. A gripping device comprising a gripping-loop, a main supporting member adapted to fulcrum on one end of said loop, a link connection between the outer end of said loop and said supporting member wholly without the confines of said loop, and means whereby said link connection is normally pressed in the direction of said loop, substantially as and for the purpose set forth.

2. A gripping device comprising a gripping-loop, a main supporting member adapted to fulcrum on one end of said loop, and a link member carrying the other end of said loop and having a fulcrum bearing on said supporting member adapted to change the center upon which said link member swings during the gripping operation, substantially as and for the purpose set forth.

3. A gripping device comprising a gripping-loop, a main supporting member adapted to fulcrum on one end of said loop, and a link member carrying the other end of said loop, and having a fulcrum-hook bearing on a fulcrum on said main support whereby the fulcrum-point of said link is adapted to move from the point of said hook to within the same during the application of the leverage, substantially as and for the purpose set forth.

4. In a gripping device, the combination of a main supporting member, and a gripping-loop connected to said member and on which the latter is also fulcrumed, the engaging surfaces at the fulcrum-point having diverging faces, whereby the initial leverage applies pressure to compress the loop and the pressure of the continued leverage is diverted to apply a wrenching action to said loop, substantially as and for the purpose set forth.

5. In a gripping device, the combination of a main supporting-lever, and a gripping-loop connected to said supporting-lever and on which said lever is also fulcrumed, the fulcrum-engaging surface on said lever having diverging faces, whereby the initial leverage applies pressure to compress the loop and the pressure of the continued leverage is diverted in part to apply a wrenching action without increasing the loop compression beyond a predetermined limit, substantially as and for the purpose set forth.

6. A gripping device comprising a gripping-loop, a main supporting member adapted to fulcrum on one end thereof, a link carried by said supporting member and adapted to bear on said loop, and pressure means in engagement with said loop, substantially as and for the purpose set forth.

7. A gripping device comprising a gripping-loop, a main supporting member adapted to fulcrum on one end thereof, a link carried by said supporting member and adapted to bear on said loop adjacent its other end, and pressure means in engagement with the said latter end of the loop, substantially as and for the purpose set forth.

8. A gripping device comprising a gripping-loop, a main supporting member adapted to fulcrum on one end of said loop, a link carried by said supporting member adapted to bear on the other end of said loop, and yielding means for holding said last-mentioned end in engagement with said link, substantially as and for the purpose set forth.

9. A gripping device comprising a segmental gripping-loop, a main supporting member adapted to fulcrum on one end thereof, a link carried by said supporting member and adapted to bear on the other end segment of the loop intermediate the ends of said segment, and pressure means for engagement with the outer end of said segment, substantially as and for the purpose set forth.

10. A gripping device comprising a segmental gripping-loop, a main supporting member adapted to fulcrum on one end thereof, a link carried by said supporting member and adapted to bear on the other end segment of the loop, and locking means for the outer end of said segment adapted to have movement therewith, substantially as and for the purpose set forth.

11. In a gripping device, a main supporting member, a gripping-loop on which said supporting member fulcrums, a link carried by said supporting member and bearing on the outer terminal segment of said loop at a point intermediate the ends of said segment, and a spring-actuated sliding member on said supporting member, carrying a pivoted dog engaging the outer end of said terminal segment.

12. A gripping device comprising a main supporting member, a link carried thereby, a gripping-loop having terminal segments adapted to hook upon the said supporting member and within said link, respectively, the segment engaging said link having a hooked extension, and a spring-actuated sliding member carried by said supporting member and adapted to engage the hook of said extension, substantially as and for the purpose set forth.

13. A gripping device comprising a segmental gripping-loop, a main supporting member adapted to fulcrum on one terminal segment thereof, a link carried by said supporting member and adapted to bear on the other terminal segment of the loop intermediate the ends of said segment, and pressure means in engagement with said link and the outer end of said last-mentioned terminal segment and adapted to maintain pressure on said link independent of the pressure exerted on said segment, substantially as and for the purpose set forth.

14. A gripping device comprising a gripping-loop, a main supporting member having a shifting fulcrum on one end of said loop, a bent link having a shifting fulcrum on said main support and a bearing-point on the other end of said loop, said fulcrums and bearing-point being moved toward alinement with each other during the application of wrenching power.

15. A gripping device comprising a gripping-loop, a main supporting member having a shifting fulcrum on one end of said loop, a bent link having a shifting fulcrum on said supporting member and pressing at a point on the other end of said loop in a direction to close the loop, said fulcrums and point having a tendency to approach alinement upon the application of wrenching force, whereby the crushing force on the pipe is diminished.

16. A gripping device comprising a gripping-loop, a main supporting member having a shiftable supporting engagement with one end of said loop, and a hooked or bent link having shiftable engagement with said main supporting member and bearing on and supporting the other end of the loop, the arrangement and proportion of the parts being such that a straight line drawn through the points of engagement between the link and the main supporting member and between the latter and the loop will pass between the axis of the loop or pipe and the point where the link bears on said loop.

17. A gripping device comprising a gripping-loop, a main supporting member fulcrumed on one end of said loop, and a link fulcrumed on said main supporting member and bearing on the other end of said loop, the parts being so proportioned and arranged that a straight line extending through the fulcrum-points of said member and link will pass between the axis of the loop or pipe and the bearing-point of said link on the loop.

18. A gripping device comprising a gripping-loop, a lever fulcrumed on one end of said loop, a pair of lugs on said lever, a link bearing on and supporting the other end of said loop and having hooks engaging said lugs on the lever.

19. A gripping device comprising a gripping-loop, a main supporting member in the form of a lever having a shifting fulcrum on one end of said loop, and a link having a shifting fulcrum on said main support said link bearing on and supporting the other end of said loop.

20. A gripping device comprising a gripping-loop, a main supporting member engaging and supporting one end of said loop, and a hooked or bent link engaging a lug or lugs on the main supporting member and bearing on the other end of the loop.

In testimony whereof I have signed this application in the presence of two subscribing witnesses.

EBENEZER FISHER.

Witnesses:
BYRON STOVER,
RICHARD CARTER.